United States Patent
Kubista

(10) Patent No.: US 6,721,798 B1
(45) Date of Patent: Apr. 13, 2004

(54) METHOD AND APPARATUS FOR CONVERTING IP DATAGRAM TO/FROM ETHERNET FRAMES

(75) Inventor: Paul B. Kubista, West Concord, MN (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/306,235

(22) Filed: May 6, 1999

(51) Int. Cl.[7] .............................................. G06F 15/16
(52) U.S. Cl. ........................ 709/236; 709/250; 710/260
(58) Field of Search ................................ 709/250, 236, 709/246, 245, 230, 212, 213; 710/262, 260; 370/463, 219; 375/219

(56) References Cited

U.S. PATENT DOCUMENTS

| | | | | |
|---|---|---|---|---|
| 5,659,758 A | * | 8/1997 | Gentry et al. ................ | 395/733 |
| 5,717,932 A | * | 2/1998 | Szczepanek et al. ......... | 395/733 |
| 5,740,467 A | * | 4/1998 | Chmielecki, Jr. et al. ..... | 710/56 |
| 5,797,039 A | * | 8/1998 | Cochavy ....................... | 710/52 |
| 5,797,041 A | * | 8/1998 | Yasue et al. .................. | 710/52 |
| 6,038,607 A | * | 3/2000 | Hamilton et al. ............ | 709/236 |
| 6,112,252 A | * | 8/2000 | Hausman et al. ............ | 709/250 |
| 6,115,776 A | * | 9/2000 | Reid et al. ................... | 710/260 |
| 6,216,182 B1 | * | 4/2001 | Nguyen et al. ............... | 710/48 |
| 6,256,677 B1 | * | 7/2001 | Pribnow et al. ............. | 709/250 |

* cited by examiner

*Primary Examiner*—Ario Etienne
*Assistant Examiner*—Abdullahi E. Salad
(74) *Attorney, Agent, or Firm*—Bracewell & Patterson LLP

(57) ABSTRACT

A method and apparatus is provided for an Ethernet station that transmits blocks of Ethernet frames in datagrams utilizing a pointer at the beginning of the datagram, rather than interrupts at the beginning and end of each data frame. Hardware receives a pointer to the start of an IP datagram and is then prompted to transmit. Hardware forms the frame header and sends out the IP datagram as a series of frames with only one interrupts signaling the end of the datagram. As a transmission comes in to the receiving station, hardware will check first to see if this is part of an IP datagram currently being received. If not, the frame is stored in a new location. If it is part of a datagram that is currently being received, hardware will check an offset in the IP header to determine where the new frame should be placed so the IP datagram is assembled properly. An interrupt is generated as the final frame is received by the receiving station, thus eliminating multiple interrupts after each frame at both transmitting and receiving station.

12 Claims, 7 Drawing Sheets

METHOD AND APPARATUS FOR CONVERTING IP DATAGRAM TO/FROM ETHERNET FRAMES

BACKGROUND OF THE INVENTION

1. Technical Field

The present invention relates in general to data processing systems and in particular to communication between networked data processing systems. More particularly, the present invention relates to Ethernet based communication between networked data processing systems.

2. Description of the Related Art

Standard telecommunications networks are generally linked to each other using protocols based on the Open Systems Interconnection (OSI) model, an internationally accepted framework of standards for communication between different systems produced by different manufacturers. The OSI model creates an open systems networking environment where any manufacturer's data processing system, when connected to a network, shares data with any other system on that network or linked network.

The OSI model organizes the communication process into seven layers of interrelated protocols in a layered sequence. FIG. 3A depicts two OSI stacks 304 and 308, one transmitting and one receiving, illustrating the seven layers of the OSI model. The layers are as follows:

Physical Link provides transmission of signals and activation and deactivation of physical connections;

Data Link includes signal synchronization, error correction; sequencing and flow control. This layer also provides a data transmission link across one or several physical connections;

Network Layer provides routing and switching functions;

Transport Layer utilizes the preceding three layers;

Session Layer provides the means to establish a session connection and to support an orderly exchange of data and related control functions for a particular communication service;

Presentation Layer provides means for data formatting and code conversion; and

Application Layer applies required transmission protocols to data to be transmitted.

Referring to FIG. 3A, a high-level block diagram of the ethernet network communication process, as it pertains to sending and receiving stations, is depicted. Transmit station 302 has data to transmit and the process of transmission begins in the Application layer. Application layer 304 determines the data to be transmitted and applies the required transmission protocol. Each layer modifies the data with transit and identification information. Prior to transmission, the data is broken into multiple sections called "packets" and each packet receives a header with source and destination information. The packets are then packaged in a larger Internet Protocol (IP) packet termed a "datagram". The datagram is passed to a subsequent layer and broken into data frames, specific to the network, with headers attached prior to transmission and are usually transmitted in order, but they may not arrive at receiving station 310 in order. Because packets contain sufficient information to be routed from source to destination and there is information within the datagram to re-assemble the datagram at receiving station 310, it doesn't matter if the data is transmitted or received in order. The data is passed through each layer at transmit station 302 and transmitted on communications network channel 306. As the data is received, the headers are stripped by receiving station layers 308 as the frame is passed from layer to layer in receiving station 310. The Application layer at receiving station 310 receives the transmitted data with all the headers stripped from the data that were added by transmitting station 302.

FIG. 3B illustrates a TCP/IP protocol transmission utilizing the OSI model. OSI model 312 characterizes the seven layers of functionality. Embodiment of transmission by TCP/IP protocol on an Ethernet is shown in conceptual layers 314. Viewing data progression 316 and conceptual layers 314, a data stream (or messages) is originated by the application layer and passed to the Transport layer which adds a TCP header and forms the data into a transport packet. The transport packet is then passed to the Internet Protocol layer which installs a header to the transport packet and depending on the size of the packet may segment the data into smaller packets. An IP datagram (maximum is 65000 bytes) may be formed and comprises a header containing information required to deliver the datagram, including the total length of the datagram, to a destination station. Additionally, the header contains information concerning the source, whether a datagram may be fragmented, offset that identifies packets for reassembling, protocol in the data portion, etc. IP datagrams may then be passed to a Network Interface which reduces the IP datagrams to Ethernet frames (maximum data is 1500 bytes) and passes the resulting packets (frames) to the Hardware layer which then transmits the Ethernet frames onto the Ethernet.

Ethernet communications are accomplished by transporting digital communications in "frames" across a network of computers or "stations." A frame, the basic data transmission unit in bit oriented protocols, is a discrete group of data bits in a particular protocol, with flags to indicate a beginning and an end of the frame. The frame usually contains addressing and error checking information.

On an Ethernet based network, multiple stations are connected to a shared signaling system. All the Ethernet signals are serially transmitted to every connected station. The header applied to data to be transmitted includes Medium Access Control (MAC) and consists of a preamble, destination address, source address and the data type segments of the frame. MAC determines access to a shared channel within an Ethernet medium (signaling system).

A unique address (48 bits) is assigned to Ethernet cards as they are manufactured. As a frame is placed in the channel of an Ethernet medium, all connected Ethernet cards check the MAC for the destination address. The Ethernet card compares the destination address with the address it was manufactured with. Only the Ethernet card with the destination address will read the entire frame. All the other cards on the network will ignore the data in the frame when the other cards determine the address does not match with their manufacture installed address.

As Ethernet networks become faster, data generated and transmitted across the network must be handled faster. Performance suffers if hardware/software doesn't keep up. As discussed above, the processor takes data to be transmitted and utilizing software, breaks the data into Ethernet frames. The frames are stored in memory and then transmitted with the appropriate headers. Breaking up the data into Ethernet frames and then transmitting them requires microprocessor time. Each frame, whose maximum data length is 1500 bytes, would require an interrupt as the frame has completed transmitting. If there is a considerable amount of data to be transmitted, a datagram may be used to provide continuity, but the frames still have to be constructed requiring at least two interrupts per frame.

Referring to FIG. 4A, a high-level flow diagram of an Ethernet frame transmission process on a network, is illustrated. The process begins with step 400, which depicts the operating application on the network station designating data to transmit onto the network. The process then passes to step 402, which illustrates each functional layer adding a header to each frame of data. Next the process proceeds to step 404, which depicts the data link layer storing each frame in station memory. The process continues to step 406, which depicts software prompting the hardware (hardware refers to the hardware layer, including registers on board the ethernet chip, of the station which interfaces with the network) to retrieve a frame from memory and transmit the frame.

The process then passes to step 408, which illustrates hardware transmitting a frame. The process continues to step 409 which depicts hardware in the transmitting station generating an interrupt after transmitting a frame. The process next proceeds to step 410, which illustrates the receiving station receiving the frames transmitted by the originating station and generating an interrupt, which is sent to the station microprocessor, after each frame. The process then passes to step 412, which depicts a determination of whether all frames have been transmitted. If not, the process returns to step 408 and repeats step 408 through step 410. If all frames have been transmitted, the process proceeds instead to step 414, which depicts the data link layer in the receiving station removing the data link header and passing the frame onto the network layer. The process continues to step 416, which illustrates all frames being stripped of the headers at layers corresponding to layers of the transmitting station and receiving the transmitted data.

As indicated in the above high-level flow diagram, each frame receives an interrupt, prompted by the software, as it is transmitted resulting in an unnecessary load on the processor An IP datagram may be segmented into multiple Ethernet frames and each Ethernet frame generally requires individual handling. When an Ethernet frame is transmitted, an interrupt is usually generated once the frame has completed transmitting. A transmission of multiple frames requires multiple interrupts to be generated requiring processor time. A datagram, with a full complement of 1500 byte frames still requires frame interrupts which may amount to 32 interrupts with a full sized datagram.

It would be desirable therefore, to reduce the processing load on the station microprocessor and thus free up the microprocessor to accommodate other applications and improve processor performance. It would also be desirable to provide a method that would reduce workload on the processor caused by interrupts for Ethernet frames. Additionally, it would also be desirable to reduce the workload on a receiving station's processor by reducing the need to correlate each Ethernet frame.

SUMMARY OF THE INVENTION

It is therefore one object of the present invention to provide a method and apparatus that will reduce the processing load on the computer processing unit.

It is another object of the present invention to provide a method and apparatus for improving data transmission rate on an Ethernet network.

It is yet another object of the present invention to provide a method and apparatus for handling data transmission on an Ethernet network more efficiently.

The foregoing objects are achieved as is now described. A method and apparatus is provided for an Ethernet station that transmits blocks of Ethernet frames in datagrams utilizing a pointer at the beginning of the datagram, rather than interrupts at the beginning and end of each data frame. Hardware receives a pointer to the start of an IP datagram and is then prompted to transmit. Hardware forms the frame header and sends out the IP datagram as a series of frames with only one interrupts signaling the end of the datagram. As a transmission comes in to the receiving station, hardware will check first to see if this is part of an IP datagram currently being received. If not, the frame is stored in a new location. If it is part of a datagram that is currently being received, hardware will check an offset in the IP header to determine where the new frame should be placed so the IP datagram is assembled properly. An interrupt is generated as the final frame is received by the receiving station, thus eliminating multiple interrupts after each frame at both transmitting and receiving station.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
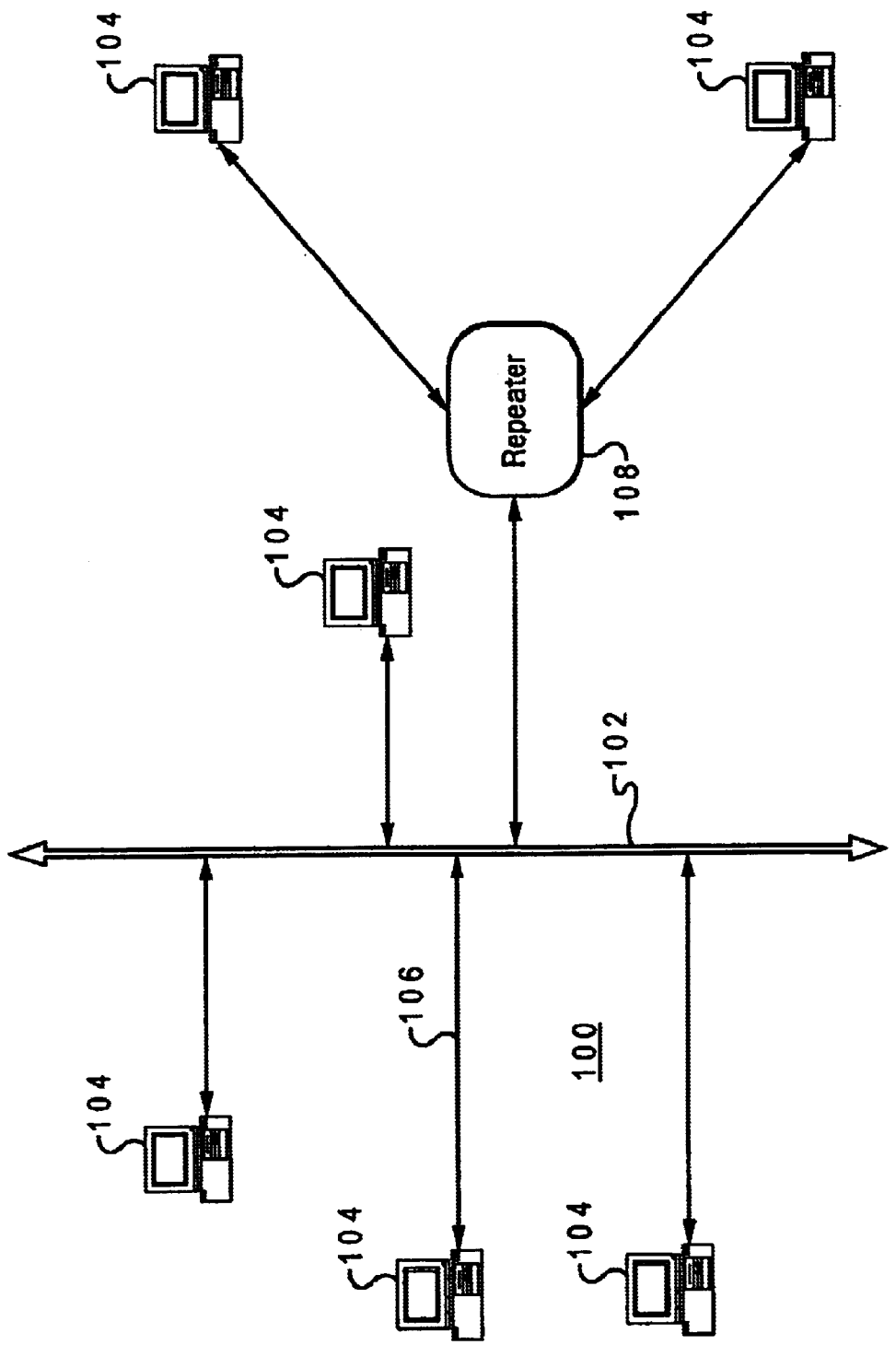
FIG. 1 depicts a high-level block diagram of an Ethernet network in which a preferred embodiment of the present invention may be implemented.

With reference now to the figures, and in particular with reference to FIG. 1, a high-level block diagram of an Ethernet network in which a preferred embodiment of the present invention may be implemented, is depicted. Network 100 comprises multiple stations 104 (computers, printers, terminals, servers, etc.) interconnected via a medium 102, which may comprise twisted pair, coaxial cable, fiber, etc. Each station 104 is equipped with an Ethernet card (not shown) which has a unique address and operates independently of all other Ethernet cards on the network. An extension of the network may connect network 100 with outside networks or with the Internet. Repeater 108, a signal amplifying and re-timing device, may be utilized to link multiple segments or networks to form an extended network. A signal sent by any station 104 travels over all segments and is heard by all other stations over the Ethernet channel.

Figure 2A:
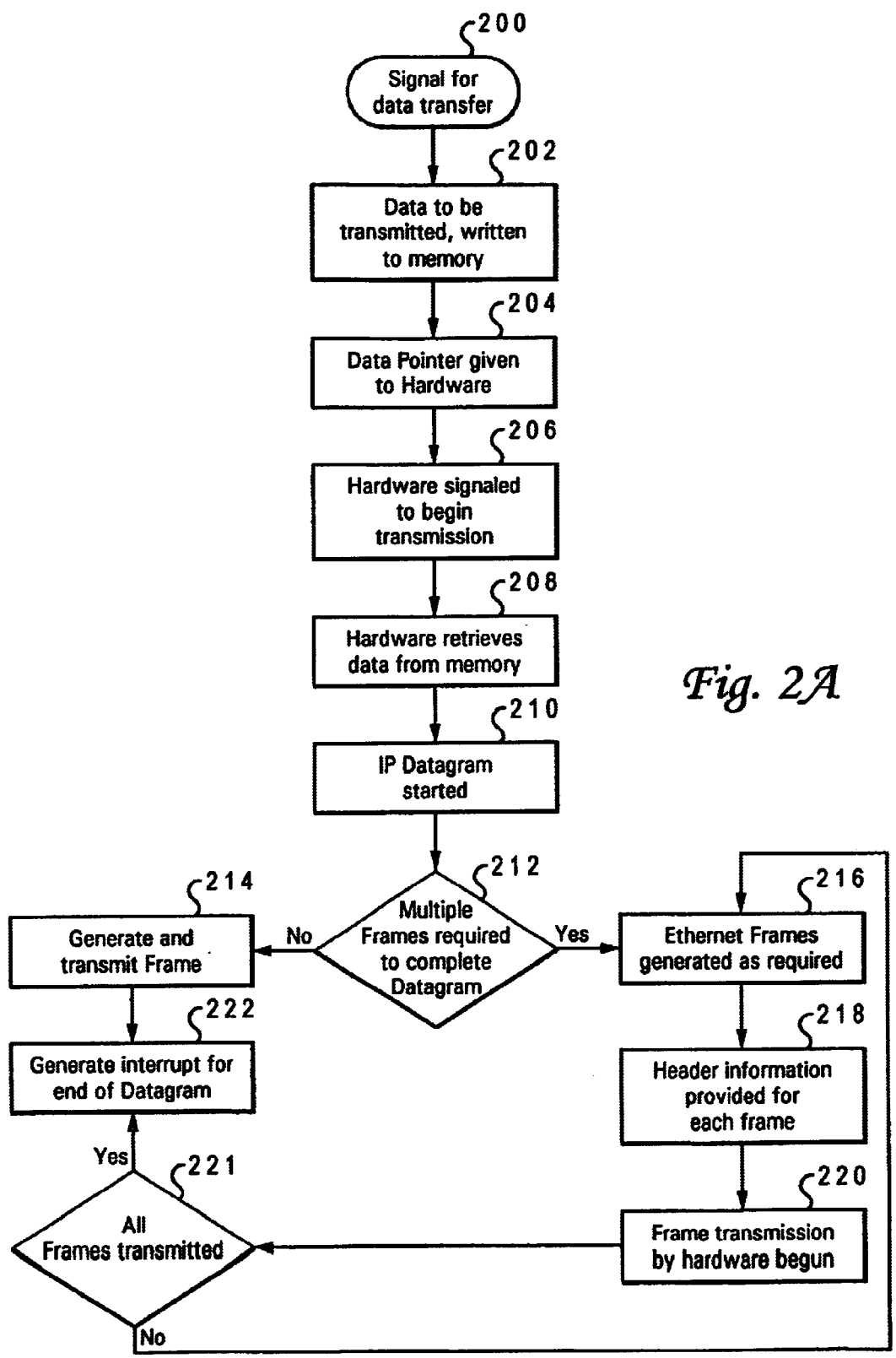
FIG. 2A is a high-level flow diagram of a method for improving processor performance in a network station during data transmission, in accordance with a preferred embodiment of the present invention.
Figure 3A:
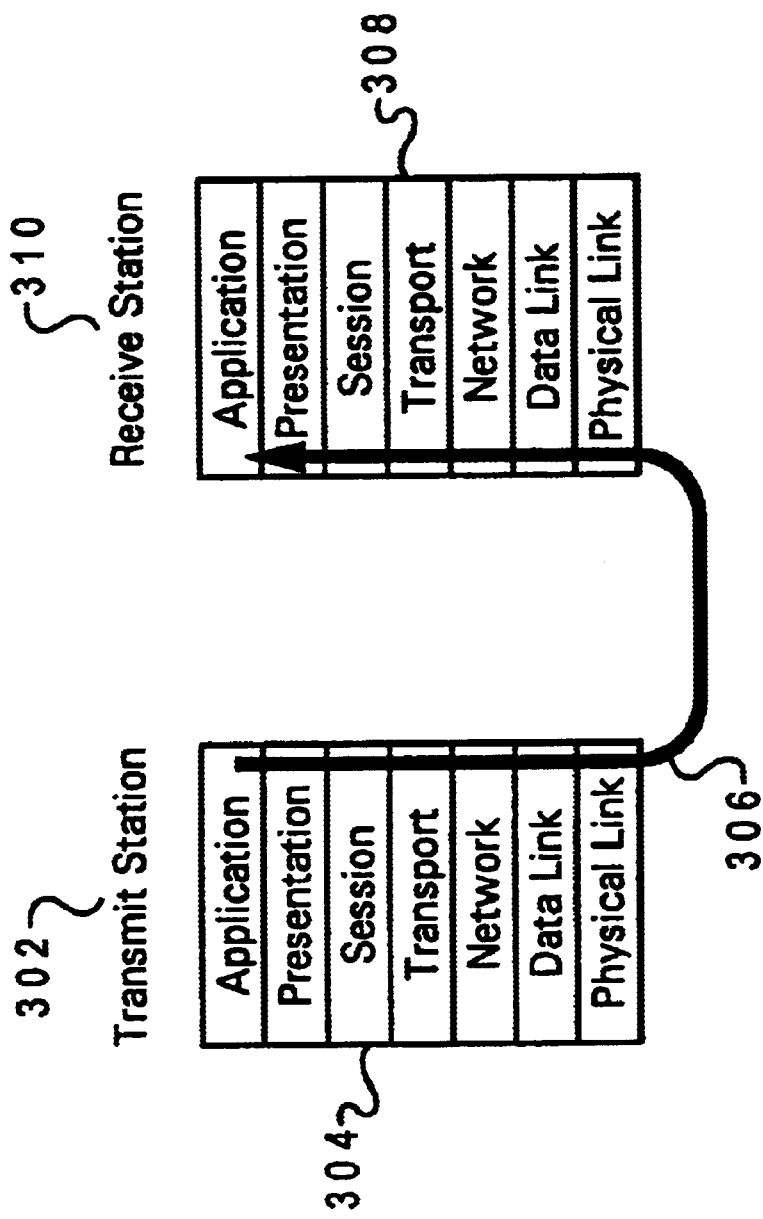
FIG. 3A depicts a high-level block diagram of the ethernet network communication process, as it pertains to sending and receiving stations.
Figure 3B:
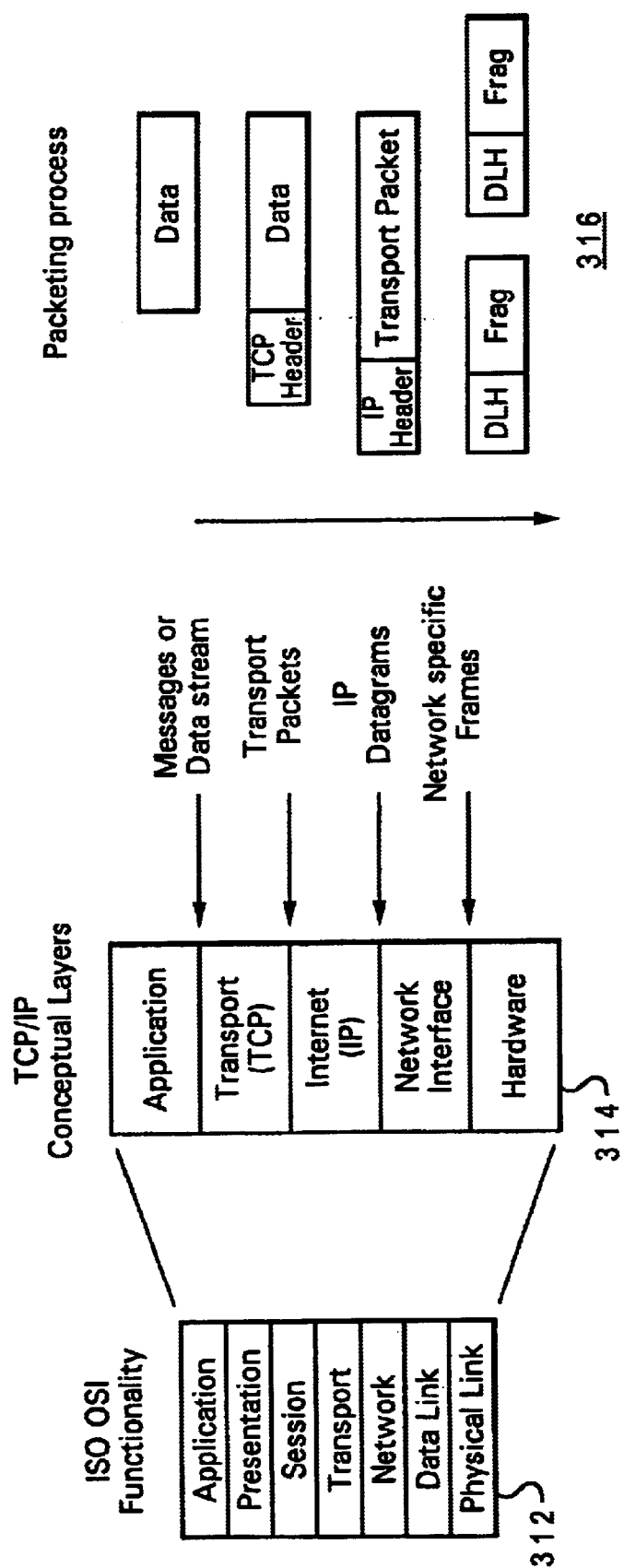
FIG. 3B illustrates a TCP/IP protocol transmission utilizing the OSI model.

Referring now to FIG. 2A, a high-level flow diagram of a method for improving processor performance in a network station during data transmission in accordance with a preferred embodiment of the present invention, is illustrated. The process begins with step 200, which depicts an application generating a signal for data transfer. The process continues to step 202, which illustrates the data to be transmitted being written to memory. The process then passes to step 204, which depicts a data pointer to the start of an IP datagram, containing the data to be transmitted, being generated and sent to Hardware (one of the OSI layers, see FIG. 3). The process proceeds to step 206, which illustrates the application instructing Hardware layer to transmit the data indicated by the pointer.

The process then passes to step 208, which depicts Hardware layer, utilizing the pointer, retrieving the data from memory. The process then proceeds to step 210, which illustrates the IP datagram beginning transmission. Next the process proceeds to step 212, which depicts a determination of whether multiple frames will be required to complete the datagram. If not, the process passes to step 214, which depicts the hardware adding a header to the data (in this case the data would consist of a single frame) and transmitting the frame. The process continues to step 222, which illustrates the generation of an interrupt signaling the end of the data transmission.

If the determination, in step 212, is made that multiple frames (datagram) will be required to complete the datagram, the process proceeds, instead, to step 216, which illustrates multiple Ethernet frames generated to transmit the data onto the network. The process then passes to step 218, which depicts header information being added to individual frames containing the data. Next, the process passes to step 220, which illustrates Hardware beginning to transmit frames onto the network. The process then proceeds to step 221, which depicts a determination of whether all the frames have been transmitted. If all the frames have not been transmitted, the process returns to step 216 and repeats steps 216 through 221 until there are no more frames to transmit. If there are no more frames to transmit, the process then passes to step 222, which illustrates the generation of an interrupt to signal the end of the IP datagram (multiple frames containing the data to be transmitted).

Figure 2B:
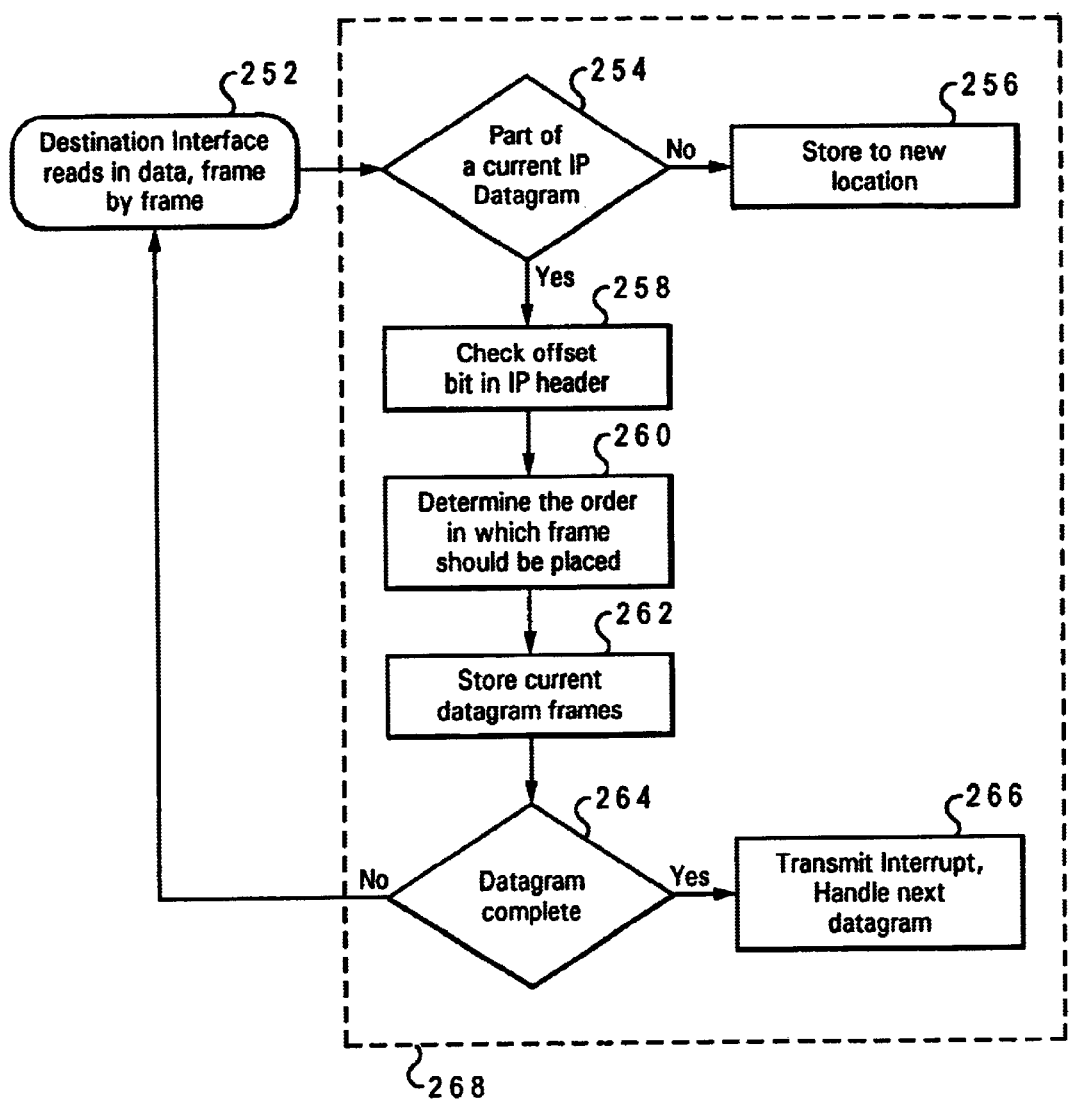
FIG. 2B depicts a high-level flow diagram of a method for improving processor performance in a network station during data reception, in accordance with a preferred embodiment of the present invention.

Referring to FIG. 2B, a high-level flow diagram of a method for improving processor performance in a network station during data reception, in accordance with a preferred embodiment of the present invention, is depicted. In this high-level flow diagram a transmitting station on the network has sent out data in the form of a datagram, consisting of multiple frames containing data, addressed to a receiver station on the network. A receiving station begins the process with step 252, which depicts the hardware layer (including programmed registers on board the ethernet chip) of the receiving station determining that the address of the datagram matches the address of the receiving station and begins receiving the transmitted data, frame by frame.

Within box 268, all steps are currently performed by software. The present invention programs low level registers in the ethernet chip to accomplish that portion of the process depicted in box 268. The process of the present invention continues to step 254, which depicts a determination of whether the received frames are part of a currently loading IP datagram. If not, the process passes to step 256, which illustrates hardware storing the received data frames to a different location in memory than that of the current IP datagram. If the received frames are part of the IP datagram currently being received, the process instead proceeds to step 258, which depicts hardware checking the offset bit in the IP header. Next, the process passes to step 260, which illustrates the hardware determining where in memory, reserved for the received IP datagram, the data frames should be placed so that the datagram is assembled correctly.

The process proceeds next to step 262, which depicts the datagram being assembled by storing each frame to memory. As described previously, receiving hardware strips out the header then stores the data frames in the correct order for assembly. The process then passes to step 264, which illustrates a determination of whether the IP datagram is received complete. If the IP datagram is not complete, the process returns to step 252 and repeats until all frames of the IP datagram are received. If, in step 264, the IP datagram is determined to be complete, the process instead proceeds to step 266, which depicts an interrupt being generated, signaling that the IP datagram is received and complete, and hardware then handles the next incoming datagram.

The portion of the process depicted in box 268 is accomplished by low level hardware—registers on board the ethernet chip. This improvement reduces the software load by moving software functions normally performed by the microprocessor to the registers on the ethernet chip and by greatly decreasing the number of interrupts generated as data frames are received.

Figure 4A:
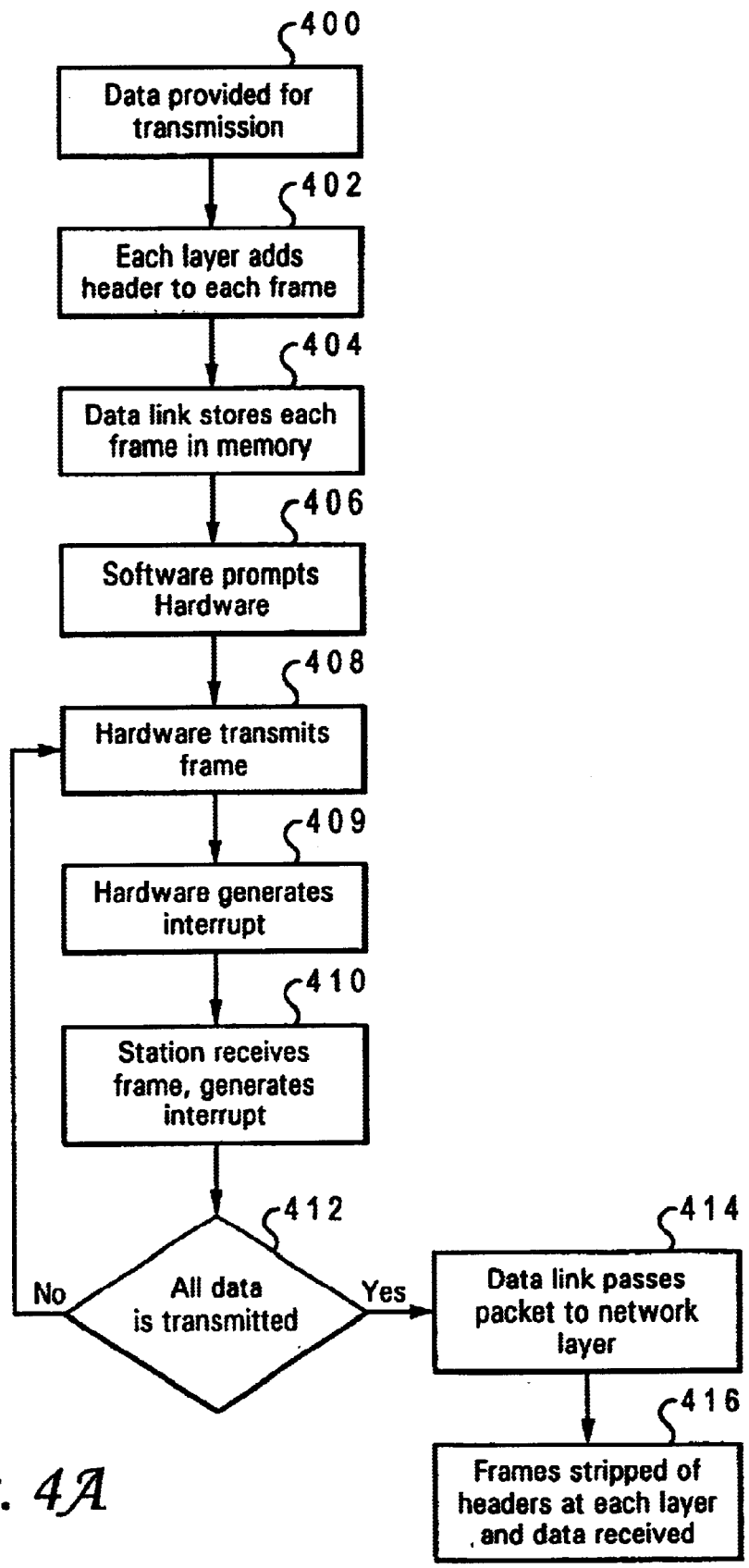
FIG. 4A depicts a high-level flow diagram of an Ethernet frame transmission process on a network.
Figure 4B:
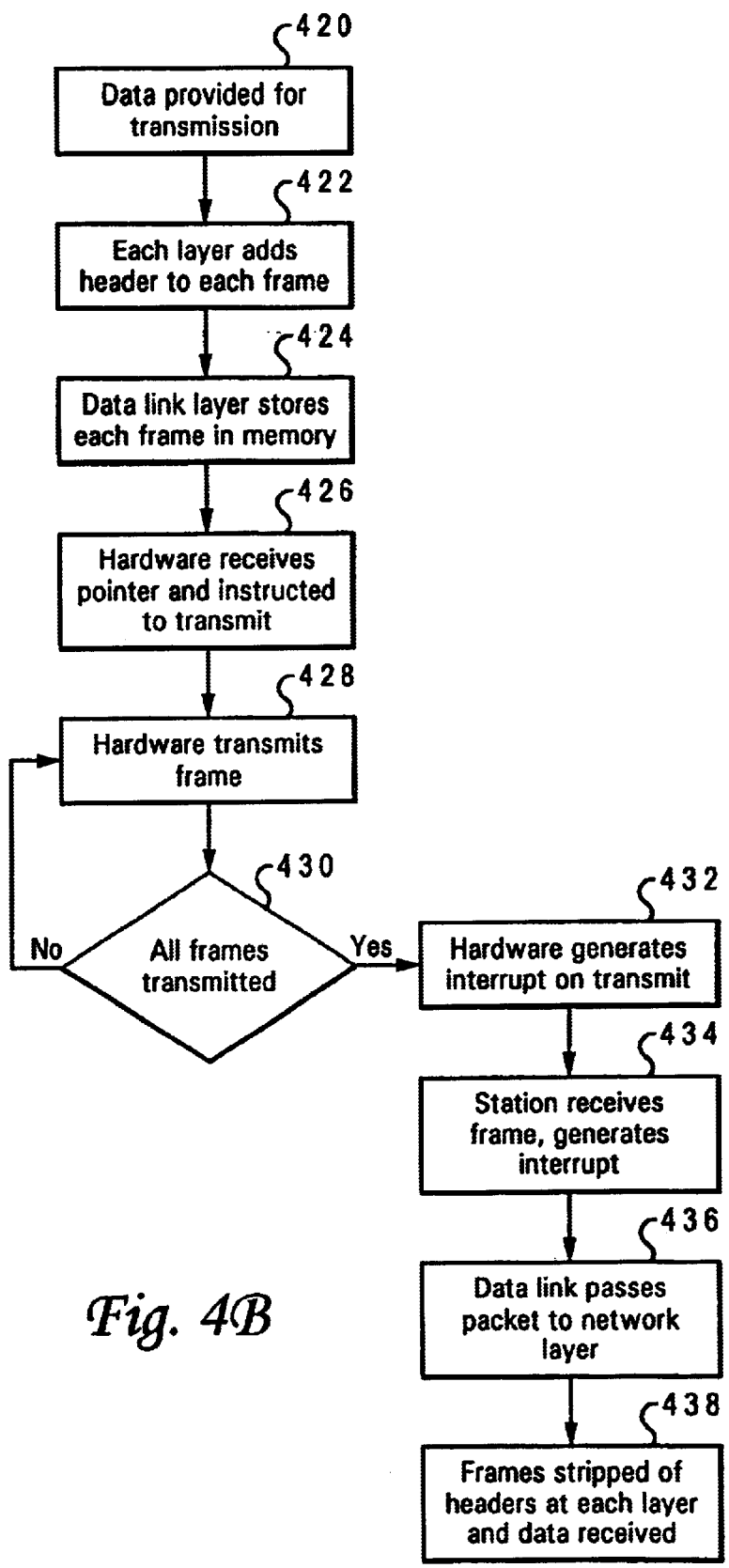
FIG. 4B illustrates a high-level block diagram of Ethernet frame transmission utilizing IP datagrams in accordance with a preferred embodiment of the present invention.

Referring to FIG. 4B, a high-level block diagram of Ethernet frame transmission utilizing IP datagrams in accordance with a preferred embodiment of the present invention, is depicted. FIG. 4A, steps 406 through 410 should be compared to steps 424–432 in FIG. 4B. The process begins with step 420, which depicts the operating application on the network station designating data to transmit onto the network. The process then passes to step 422, which illustrates each functional layer adding a header to each frame of data. Next the process proceeds to step 424, which depicts the data link layer storing each frame in station memory.

The process passes to step 426, which illustrates a pointer being sent to the hardware followed by instructions to begin transmitting the subject datagram. Next the process proceeds to step 428, which depicts the hardware beginning transmission of the datagram by sending the first data frame with the IP header. The process then passes to step 430, which depicts a determination of whether all frames have been transmitted. If all frames have not been transmitted, before proceeding further the process returns to step 428 and repeats until all frames are transmitted. If all frames have been transmitted, the process instead passes to step 432, which illustrates hardware generating an interrupt to signal the final frame has been transmitted. The interrupts required for each data frame in the known art are eliminated and replaced by a single interrupt signaling the end of the datagram. For instance, a maximum sized datagram would normally require 32 interrupts to complete where the present invention requires only one interrupt at the end of transmission. A single interrupt replacing many interrupts reduces the load on the processor.

The process then passes from step 432 to step 434, which illustrates the receiving station receiving the frames transmitted by the originating station and generating an interrupt at the end of the final frame in the datagram. The process then proceeds to step 436, which depicts the data link layer in the receiving station removing the data link header and passing the frame onto the network layer. The process continues to step 438, which illustrates all frames being stripped of the headers at layers corresponding to layers of the transmitting station and receiving the transmitted data.

Processor performance is increased when the load on the processor is reduced, because the processor is freed up to do another task or do the current task faster. To offload the processor, hardware IP datagram sending/receiving on the network is implemented. Instead of breaking up Ethernet frames and transmitting the frames, data to be transmitted is written once into memory and a pointer to the data, in the form of an IP datagram, is sent to hardware. Hardware then forms the IP datagram header and sends out the IP datagram as frames having only one interrupt at the end of the transmitted datagram. Similarly, hardware at the receiving station checks incoming frames against a received IP header, receives the incoming frames into the proper location in the proper order and generates only one interrupt at the end of the final frame in the received datagram. Instead of having all kinds of interrupts for a very large block of data there would be fewer interrupts and less data manipulation resulting in less load on the processor.

It is important to note that while the present invention has been described in the context of a fully functional device, those skilled in the art will appreciate that the mechanism of the present invention and/or aspects thereof are capable of being distributed in the form of a computer usable medium of instructions in a variety of forms, and that the present invention applies equally regardless of the particular type of signal bearing media used to actually carry out the distribution. Examples of computer usable media include: nonvolatile, hard-coded type media such as read only memories (ROMs) or erasable, electrically programmable read only memories (EEPROMs), recordable type media such as floppy disks, hard disk drives and CD-ROMs, and transmission type media such as digital and analog communication links.

While the invention has been particularly shown and described with reference to a preferred embodiment, it will be understood by those skilled in the art that various changes in form and detail may be made therein without departing from the spirit and scope of the invention.

What is claimed is:

1. A method for handling data transmission within a computer network, said method comprising:
   assigning a pointer pointing to a memory location of a memory within a sending station in which a datagram is stored;
   disassembling said datagram into a plurality of data frames and sending each of said plurality of data frames along with a respective header immediately after said each data frame has been disassembled by a data link layer of said sending station;
   transmitting said plurality of data frames without sending an interrupt after a transmission of each of said plurality of frames;
   receiving said plurality of data frames in a memory of a receiving station by a data link layer of said receiving station;
   reassembling each of said plurality of data frames to form a datagram in said memory of said receiving station; and
   generating only one interrupt after receiving all of said plurality of data frames.

2. The method of claim 1, wherein said computer network is an ethernet network.

3. The method of claim 2, wherein said method further includes storing said pointer in a register of an ethernet processor within an ethernet controller.

4. The method of claim 1, wherein said reassembling further includes
   grouping one of said received data frames to a first datagram in response to said one of said received data frames belongs to said first datagram, according to said header information of said one of said received data frames; and
   grouping one of said received data frames to a second datagram in response to said one of said received data frames belongs to said second datagram, according to said header information of one said received data frames.

5. An apparatus for handling data transmission within a computer network, said apparatus comprising:
   means for assigning a pointer pointing to a memory location of a memory within a sending station in which a datagram is stored;
   means for disassembling said datagram into a plurality of data frames and for sending each of said plurality of data frames along with a respective header immediately after said each data frame has been disassembled by a data link layer of said sending station;
   means for transmitting said plurality of data frames without sending an interrupt after a transmission of each of said plurality of frames;
   means for receiving said plurality of data frames in a memory of a receiving station by a data link layer of said receiving station;
   means for reassembling each of said plurality of data frames to form a datagram in said memory of said receiving station; and
   means for generating only one interrupt signal after receiving all of said plurality of data frames.

6. The apparatus of claim 5, wherein said computer network is an ethernet network.

7. The apparatus of claim 6, wherein said apparatus further includes means for storing said pointer in a register of an ethernet processor within an ethernet controller.

8. The apparatus of claim 5, wherein said means for generating further includes
   means for grouping one of said received data frames to a first datagram in response to said one of said received data frames belongs to said first datagram, according to said header information of said one of said received data frames; and
   means for grouping one of said received data frames to a second datagram in response to said one of said received data frames belongs to said second datagram, according to said header information of one said received data frames.

9. A computer program product residing in an instruction bearing medium for handling data transmission within a computer network, said computer program product comprising:
   program code means for assigning a pointer pointing to a memory location of a memory within a sending station in which a datagram is stored;
   program code means for disassembling said datagram into a plurality of data frames and for sending each of said plurality of data frames along with a respective header immediately after said each data frame has been disassembled by a data link layer of said sending station;

program code means for transmitting said plurality of data frames without sending an interrupt after a transmission of each of said plurality of frames;

program code means for receiving said plurality of data frames in a memory of a receiving station by a data link layer of said receiving station;

program code means for reassembling each of said plurality of data frames to form a datagram in said memory of said receiving station; and means for generating only one interrupt after receiving all of said plurality of data frames.

10. The computer program product of claim 9, wherein said computer network is an ethernet network.

11. The computer program product of claim 10, wherein said computer program product further includes program code means storing said pointer in a register of an ethernet processor within an ethernet controller.

12. The computer program product of claim 9, wherein said program code means for generating further includes program code means for grouping one of said received data frames to a first datagram in response to said one of said received data frames belongs to said first datagram, according to said header information of said one of said received data frames; and program code means for grouping one of said received data frames to a second datagram in response to said one of said received data frames belongs to said second datagram, according to said header information of one said received data frames.

* * * * *